Aug. 30, 1949.  C. E. YOST  2,480,174
COUPLING
Filed Nov. 10, 1947
Fig. 1.
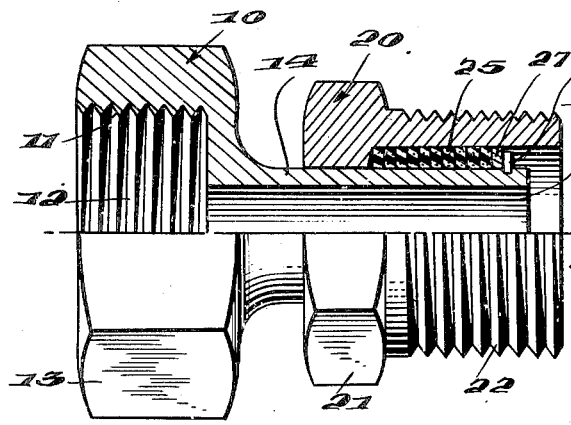
Fig. 2.
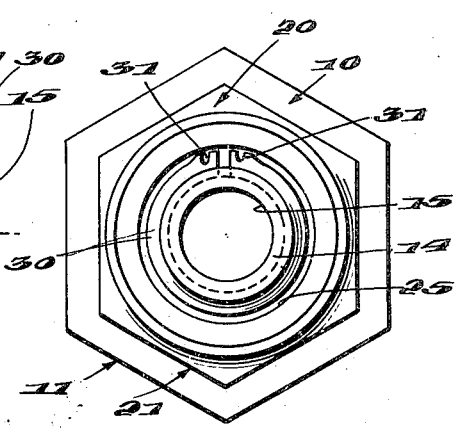
Fig. 3.
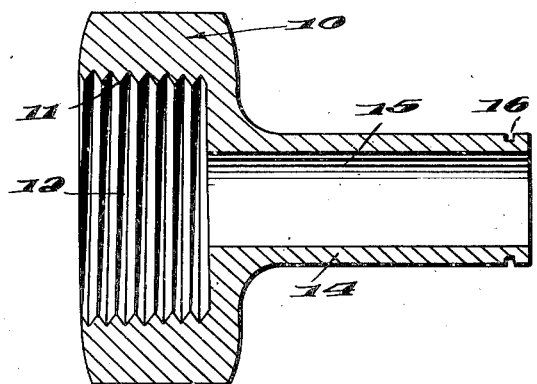
Fig. 4.
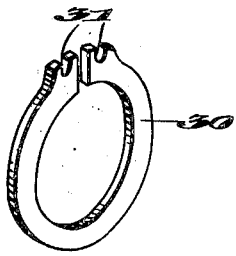
Fig. 5.
Fig. 6.
Fig. 7.
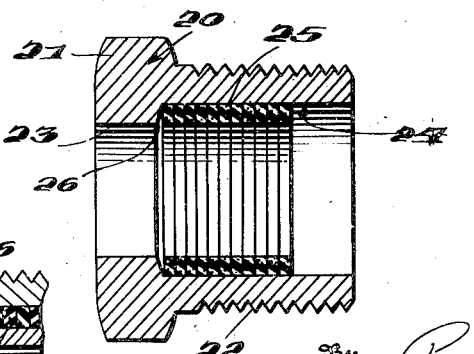
Inventors
CLYDE E. YOST,
By Parry & Miller
his Attorneys

UNITED STATES PATENT OFFICE 2,480,174

COUPLING

Clyde E. Yost, Evansville, Ind.

Application November 10, 1947, Serial No. 785,038

2 Claims. (Cl. 285—97.3)

The present invention relates to swivel couplings, such as a pipe or hose swivel and the like, and aims generally to improve existing couplings of that type.

One of the primary objects of the present invention is the provision of a coupling embodying telescoping coupling members having a packed joint therebetween which is compressed to a tighter joint upon increase of pressure of fluids through said coupling.

A further object of the invention is the provision of a packed telescoping swivel coupling member of such novel and simple construction as to permit of economical manufacture and assembly as well as ready disassembly for the replacement of the packing.

A still further object of the invention is the provision of a freely rotatable swivel coupling having an anti-friction bearing assembly between the relatively rotatable parts and having a packing for said parts effective to provide a tighter seal upon increase of fluid pressure within said coupling.

The above and other objects of the invention will be apparent to persons skilled in the art to which the invention relates from a consideration of the accompanying drawings and annexed specification illustrating and describing a preferred embodiment of the invention.

In the drawings—

Fig. 1 is a sectional elevation of a typical hose swivel embodying the invention;

Fig. 2 is an end elevation thereof as viewed from the right hand end of Fig. 1;

Fig. 3 is a longitudinal sectional view of the internally threaded connector part, commonly called the stem end part of the hose swivel;

Fig. 4 is a detail perspective view of the locking ring therefor;

Fig. 5 is a longitudinal sectional view of the externally threaded connector part, commonly called the slip part of a hose swivel, and illustrating a packing therein;

Fig. 6 is a detail sectional view of the packing retaining washer; and

Fig. 7 is a detail fragmental longitudinal sectional view of a modified form of coupling.

The improved swivel coupling of the present invention preferably is embodied in telescoping relatively rotatable and axially slidable stem and sleeve members having a packed joint therebetween of substantial length, the coupling being locked in assembly by a readily replaceable locking member designed to permit the pressure of fluid within the coupling to compress the packing and tighten the joint therebetween.

In the illustrated example, the invention is embodied in a hose swivel comprising a stem part 10 and a sleeve part 20 connected for relative rotation and axial sliding movement. The stem part 10 is provided with a screw-threaded portion 11 at one end, preferably in the form of a socket 12 having a wrench-receiving face 13 by means of which the part 10 may be tightened upon a threaded end of a pipe or hose, as is well understood in the art. The stem part 10 is also formed with an integral barrel 14 having a bore 15 communicating with the socket 12, the outer face of the barrel 14 providing a relatively long cylindrical sleeve surface over which the sleeve or nipple part 20 is fitted. Adjacent the terminal end of the barrel there is provided an annular groove or recess 16 for the reception of a locking key or ring later to be described.

The sleeve part 20 is preferably a tubular member having a wrench-receiving head 21 at one end and a screw-threaded nipple end 22 adapted for threaded connection with a screw-threaded end or fitting of a second pipe or hose section. The head end 21 of the part 20 is apertured as at 23 to receive slidably the rotatable barrel 14 and form a swivel joint therewith, and the body of the part 20 is provided with an elongated packing chamber 24 to receive a suitable packing 25. This chamber 24 is of larger diameter than the joint bore 23, thus forming a shoulder 26 at the head end of the sleeve against which the packing may be pressed to tightly pack the joint bore 23 against leakage.

The packing 25 may be of any of the well known types suitable for the purpose, such as a strip of suitable compressible material coiled or wound within the chamber 24 to present a plurality of convolutions of packing. Preferably, the packing may comprise a plurality of washers of leather, rubber compound or like flexible material. The packing 25 is retained within the chamber 24 by means of a washer 27, preferably of metal, and is of such diameter as to have a sliding fit within the bore of the chamber 24 and barrel 14.

The above component parts of the coupling are retained in assembled relation by means of a locking key or ring connected to the terminal end of the barrel and overlying the packing retaining washer. Preferably the locking ring or key is a contractible spring ring 30 adapted to fit into the annular groove 16 and to be snap-locked therein by the inherent contraction of the ring. The terminal ends of the ring 30 may be provided with suitable tool-receiving recesses 31 for the reception of a suitable expanding tool for expanding the ring to facilitate the removal thereof from the stem part. This permits ready removal of the sleeve part from the stem part for replacement of the packing when desired.

From the above description it will be apparent that when the coupling is embodied in a hose coupling, as illustrated, the pressure of fluid within the bore will act upon the outer face of the washer 27, compressing the packing axially and against the shoulder 26, and packing the swivel joint between the bore 23 and the barrel 14 against leakage. It will be apparent that the greater the pressure of the fluid within the bore 15, the tighter the joint will be packed while still permitting unrestricted relative rotation of the coupling parts 10 and 20.

In instances where high fluid pressures are employed the packing may be so tightly packed against the joint between the stem and sleeve as to resist free swivelling or relative rotation of the parts. To overcome this objection I provide an anti-friction bearing disposed in the chamber 24 and positioned between the innermost packing ring or convolution and the head end of the sleeve. Such anti-friction bearing advantageously may comprise washers or races 35—36 and intermediate ball bearings 37 interposed between the shoulders 26 of the sleeve part 20 and the innermost packing ring 29. Thus when the packing is compressed by the pressure of fluid within the bore 15, it packs the joint between the stem 14 and race 36 and effectively seals the joint between the sleeve and stem while permitting free relative rotation of the parts.

The device embodying the present invention has been effective in providing a substantially leak-proof coupling for liquids under high pressure and has withstood a pull pressure of about three tons.

While I have illustrated and described my invention with particular reference to its use as a swivelled hose coupling, I do not intend to be limited to the details of construction thereof as the scope of the invention is best defined in the appended claims.

I claim:

1. A coupling comprising an axially bored stem member provided at one end with conduit-engaging means, a sleeve member surrounding said stem member and forming a slidable and rotatable joint therebetween and providing an elongated packing chamber therebetween, a packing within said chamber, a pressure-receiving member in contact with said packing slidably mounted on said stem and substantially closing the space in said packing chamber between the stem and sleeve, said pressure-receiving member being independently movable in said packing chamber with respect to the stem and sleeve members in response to fluid pressure therein to compress the packing material, and means secured to an end portion of said stem to retain said stem and said sleeve in assembled relation.

2. A pressure tight coupling for fluid conduits and the like comprising an axially bored stem member provided with conduit-engaging means adjacent one end and a substantially cylindrical stem adjacent an opposite end, a sleeve member having a stem-receiving bore adjacent one end forming a slidable and rotatable joint with said stem and conduit-engaging means adjacent the opposite end, said sleeve having an axial bore of greater diameter than the stem providing an enlarged packing chamber adjacent said joint, a compressible packing in said chamber, a pressure transmitting washer in contact with said packing slidably mounted on said stem member outwardly of said packing and independently movable in said chamber with respect to the stem and sleeve members in response to fluid pressure therein to compress said packing material, and a retaining ring disposed in said chamber and locked to said stem member adjacent an end thereof to retain said stem and sleeve in assembled relation.

CLYDE E. YOST.

REFERENCES CITED

The following references are of record in the file of this patent:

UNITED STATES PATENTS

| Number | Name | Date |
|---|---|---|
| 757,992 | Clark | Apr. 19, 1904 |
| 1,074,319 | Giovannoni | Sept. 30, 1913 |
| 1,297,370 | Loomis | Mar. 18, 1919 |
| 1,535,456 | Dupree et al. | Apr. 28, 1925 |
| 2,227,105 | Pritchard | Dec. 31, 1940 |
| 2,443,993 | Schenkelberger | June 22, 1948 |